US005548422A

United States Patent [19]

Conner et al.

[11] Patent Number: 5,548,422
[45] Date of Patent: Aug. 20, 1996

[54] NOTCH FILTERS WITH CHOLESTERIC POLARIZERS WITH BIREFRINGENT FILM AND LINEAR POLARIZER

[75] Inventors: Arlie Conner, Tualatin; Jonathan R. Biles; Terry J. Scheffer, both of Portland; Gary B. Kingsley, Tualatin, all of Oreg.

[73] Assignee: In Focus Systems, Inc., Wilsonville, Oreg.

[21] Appl. No.: 84,874

[22] Filed: Jun. 28, 1993

[51] Int. Cl.⁶ .................... G02F 1/1347; G02F 1/1335
[52] U.S. Cl. ................................. 359/65; 359/73
[58] Field of Search ...................... 359/53, 73, 63, 359/65, 37, 70, 68, 71, 93, 103

[56] References Cited

U.S. PATENT DOCUMENTS

| | | | |
|---|---|---|---|
| 3,957,348 | 3/1975 | Saeva | 359/65 |
| 4,017,156 | 5/1977 | Moriyama et al. | 359/73 |
| 4,019,808 | 5/1977 | Scheffer | 359/73 |
| 4,032,218 | 6/1977 | Scheffer | 359/73 |
| 4,239,349 | 12/1980 | Scheffer | 359/73 |
| 4,726,660 | 2/1988 | Rushford . | |
| 5,032,007 | 7/1991 | Silverstein et al. . | |
| 5,050,965 | 9/1991 | Conner et al. . | |
| 5,066,108 | 11/1991 | McDonald | 359/73 |
| 5,122,887 | 6/1992 | Mathewson . | |
| 5,173,808 | 12/1992 | Auer et al. . | |
| 5,184,234 | 2/1993 | Mathewson . | |
| 5,221,982 | 6/1993 | Faris | 359/73 |
| 5,295,009 | 3/1994 | Barnik et al. | 359/65 |
| 5,325,218 | 6/1994 | Willet et al. | 359/65 |
| 5,418,631 | 5/1995 | Tedesco | 359/599 |

OTHER PUBLICATIONS 22.4: "A Color STN Display with Two Retardation Compensating Films", M. Ohgawara et al, Asahi Glass Electronic Products R&D Center Co., Ltd., Yokohama, Japan, *SID 89 DIGEST*, pp. 390–393.

P-61: "Retroreflecting Sheet Polarizer", M. F. Weber, 3M, St. Paul, MN, *SID 93 DIGEST*, pp. 669–672.

P2-13: "On the Viewing Angle Dependence of Monochrome-ST LCD Using Retardation Films", Watanabe et al, Electron Device Division, Toshiba Corporation, Japan, *JAPAN DISPLAY '89*, pp. 328–331.

Paper (symposium) "Simple Method for Optimization of Electro-Optical Properties in FSTN-LCDs", Park et al, Anyang Res. Lab, Goldstar Co., Korea, 5 page.

7-6: "A New Twisted Nematic ECB (TN-ECB) Mode for a Reflective Light Valve", T. Sonehara and O. Okumura, Seiko Epson Co., Suwa, Japan, 4 pages.

P2-9: "Black and White STN-LCD Using Two Birefringent Films", Kumagawa et al, Audio Video Research Center, Kadoma, Japan, *JAPAN DISPLAY 89*, pp. 312–315.

(List continued on next page.)

*Primary Examiner*—William L. Sikes
*Assistant Examiner*—Kenneth Parker
*Attorney, Agent, or Firm*—Klarquist Sparkman Campbell Leigh & Whinston, LLP

[57] ABSTRACT

An optical notch filter component in a color LCD display comprises an electronically controllable variable retarder interposed between circularly polarizing elements. Entering light in a particular spectral region is circularly polarized by a first of the circularly polarizing elements, and selectively retarded by zero or a half wavelength by the retarder so as to controllably yield right or left handed circular polarization. The second circular polarizer transmits only one of the circular polarizations of the light. By controlling the circular polarization of the light with the retarder, the light is either transmitted or attenuated. More uniform stopband attenuation is provided when the optical notch filter component comprises oppositely handed circular polarizing elements and a variable retarder which applies zero retardation in one of its states. A direct view display system substantially without parallax effects is formed from a stacked assembly of the notch filter components with thin substrate construction. Higher contrast is provided by doubly analyzing each color band.

7 Claims, 7 Drawing Sheets

OTHER PUBLICATIONS

"The Color Gamut Obtainable by the Combination of Subtractive Color Dyes", Noboru Ohta, Fuji Photo Film Co., Ltd., Japan, *Journal of Imaging Science*, vol. 30, No. 1, Jan./Feb. 1986, pp. 9–12.

"The Efficient Optics of Liquid Crystal Polarized Color Projection", J. Funfschilling and M. Schadt, F. Hoffmann–La Roche Inc., Basel, Switzerland, *Optoelectronics—Devices and Technologies*, vol. 7, No. 2, Dec., 1992, pp. 263–270.

"New Liquid Crystal Polarized Color Projection Principle", M. Schadt and J. Funfschilling, F. Hoffmann–La Roche Ltd., Basel, Switzerland, *Jap. Journal of Applied Physics*, vol. 29, No. 10, Oct., 1990, pp. 1974–1984.

17A.1: "Novel Polarized Liquid–Crystal Color Projection and New TN–LCD Operating Modes", M. Schadt and J. Funfschilling, F. Hoffman–La Roche Ltd., Basel, Switzerland, *SID 90 DIGEST*, pp. 324–326.

7.6: "Polarizing Color Filters Made From Cholesteric LC Silicones", Maurer et al., Consortium Fur Elektrochemische Industrie GmbH, Munich, West Germany, *SID 90 DIGEST*, pp. 110–113.

Chapter 7 entitled "Materials and Assembling Process of LCDs", pp. 171–194, Shinji Morozumi, Seiko Epson Corporation, Suwa, Nagano, Japan, and Chapter 10 entitled Twisted Nematic and Supertwisted Nematic Mode LCDs, pp. 231–274, Terry Scheffer and Jurgen Nehring, Tektronix, Inc., Portlands, Oregon, and Asea Brown Boyeri Corporate Research, Switzerland, respectively, *Liquid Crystals Applications and Uses*, vol. 1, 1990.

NOTCH FILTERS WITH CHOLESTERIC POLARIZERS WITH BIREFRINGENT FILM AND LINEAR POLARIZER

FIELD OF THE INVENTION

This invention relates to display systems and more particularly relates to LCD display systems employing circular polarization, plastic substrate construction, and other techniques to enhance performance.

BACKGROUND AND SUMMARY OF THE INVENTION

Color displays employing liquid crystal display (LCD) techniques have been the subject of intense research and development efforts in recent years. Such displays have low power requirements, making them particularly attractive for portable applications with limited power capacity, such as battery powered laptop-type computers. Further, LCD displays can be operated to selectively filter primary colors from light projected through the display's pixels to form a colored image. Such color LCD displays are sometimes employed in cooperation with overhead projectors to project a computer generated color image onto a projection screen for viewing by a large audience.

One typical configuration of color LCD displays comprises a series stacked assembly of three electronically switchable elements, which are here termed "color filter components." Light is projected through the display from a backlight panel, overhead projector or other light source. Each of the filter components operates to selectively attenuate the incident light in one of three spectra corresponding to the three primary colors: red, green and blue. The filter components operate collectively to attenuate selected combinations of the three primary colors while the unattenuated colors of light pass through. Attenuating different combinations of the primary colors produces light of various colors. For example, attenuating red causes the display to transmit cyan light (the combination of green and blue light). Attenuating red and green causes the display to transmit blue light. Color LCD displays of this type are described by Silverstein et al. in U.S. Pat. No. 5,032,007, Conner et al. in U.S. Pat. No. 5,050,965, and Mathewson in U.S. Pat. No. 5,122,887.

In the above cited patents, each switchable color filter component comprises an LCD panel interposed between first and second dichroic linear polarizers. The LCD panel and polarizers cooperate to selectively attenuate a predetermined primary color (spectral region of light) responsive to an applied signal. In general, the first "entrance" polarizer imparts a particular linear polarization orientation (e.g. zero degrees) to entering light in the predetermined spectral region. Entering light in the spectral region having an orthogonal linear polarization (e.g. ninety degrees) is absorbed by the entrance polarizer. The polarized light then passes through the LCD panel, which varies the polarization state in the predetermined spectral region. The second "exit" polarizer only transmits the light having a polarization parallel to its own polarization axis. Light of an orthogonal polarization is absorbed. Thus, by applying an appropriate signal, the predetermined primary color can be either passed or attenuated by the LCD filter component.

Although described in the foregoing paragraph as a single optic element, the LCD panel usually defines a plurality of separate, independently operable pixels. Electrical signals can be individually applied to each pixel to control the polarity of light passing therethrough to effect selective attenuation of the light in that filter component's predetermined spectral region. When filter components are placed in a series stacked assembly to form a color LCD display, the pixels of the separate filter components are aligned. In this manner, each pixel of a color image is produced by light which passes through an aligned set of LCD panel pixels, one in each filter component's LCD panel. The LCD panel pixels in the aligned set operate in series to subtract red, green, and blue as desired from entering light to produce a net color for each pixel in the image.

Ideally, each of the filter components should operate as a perfect notch filter (i.e. one which completely attenuates any incident light in a predetermined stopband spectral region and passes unattenuated any incident light in a passband region outside the stopband region). Color LCD displays with switchable color filter components of the above described configuration perform adequately to produce color images. However, due to limitations inherent in presently available materials, such filter components fail to provide performance even roughly approximating notch filters. As a result, the color LCD displays constructed with these filter components have suffered certain drawbacks, including diminished brightness and lower contrast. Diminished brightness results from the partial attenuation of light outside a filter component's stopband regions, i.e. in its passband regions. Lower contrast (the ratio of the luminance of the brightest displayable color, white, to the darkest, black) results from the failure of the filter components to completely attenuate light in their stopband regions and from having overly broad transition band regions (between the stopband and passband regions). The filter components insufficiently attenuating stopbands and overly broad transition bands result in leakage of light when all three filter components of a color LCD display are operated collectively to form black by attenuating all three primary colors. This results in a black which is too bright and, consequently, lowers display contrast.

To increase contrast, the three color stopbands of the filter components in some prior displays have been partially overlapped. The overlapped stopbands increase the darkness of black by preventing leakage of light between the stopbands. This overlap, however, also diminishes independent control of the three colors, particularly when the filter component's transition bands (stopband skirt) are wide. Additionally, overlapping the filter component's stopbands can result in poor color brightness since each overlapping stopband is too wide to allow good transmission of light in the spectral regions controlled by the other filter components.

For example, the stopband of a magenta filter component (which attenuates green light) can be widened so that it overlaps the blue and red stopbands of the other filter components in a display. This overlapping prevents leakage of light when displaying black, since transition regions between the stopbands are reduced or eliminated by the overlap. However, when red is to be displayed, the wider, overlapping green stopband of the magenta filter component also attenuates some of the red light. Accordingly, brightness of red produced by the display is lessened.

A further drawback to the above described filter components is their poor thermal performance. The dichroic linear polarizers included in the filter components are generally formed from a plastic sheet containing dichroic dyestuff which is stretched in a particular direction to align the dyestuff molecules along a particular axis. The radiant energy of light whose polarization is oriented along the same axis is absorbed by the dyestuff, whereas light polarized perpendicularly is passed. (By using a colored dyestuff, only polarized light of a particular color is absorbed.) The absorbed light energy is thereby converted into heat energy. Consequently, when used in a color LCD display for projection, the dichroic linear polarizers cause the display to heat up rapidly. The display temperature can eventually increase to the point that display performance deteriorates or is impaired.

Various other configurations of electronically switchable color filter components are known. A filter component comprising a twisted nematic LCD panel sandwiched between same-handed cholesteric liquid crystal polarizers is described in Maurer et al., "Polarizing Color Filters Made From Cholesteric LC Silicones," SID 90 Digest, 1990, pp. 110–113 and in Schadt et al., "Novel Polarized Liquid-Crystal Color Projection and New TN-LCD Operating Modes," SID 90 Digest, 1990, pp. 324–326. In contrast to dichroic linear polarizers, which absorb light with a particular linear polarization orientation, cholesteric liquid crystal polarizers reflect a particular handedness of circularly polarized light in a characteristic region of the visible light spectrum. Since the light is reflected rather than absorbed by such polarizers, little or none of the incident light is converted to heat energy.

Another problem of prior stacked color LCD displays is that of parallax. As discussed above, pixel colors of the image produced by the displays are the result of light passing through an aligned set of filter pixels. Parallax is a visual effect resulting from viewing an image formed by light passing through misaligned filter pixels. Prior stacked color LCD displays have been constructed with their active LCD layer supported on relatively thick glass substrates, resulting in an effective thickness of the stacked filter components that is substantially greater than the width of the pixels. Because of the thickness of the stacked filter components, prior subtractive color LCD displays can only be viewed directly from within a narrow angle to avoid parallax. In such prior stacked LCD displays, it has been necessary to employ lenses which collimate light entering the display to avoid parallax effects. As a result of the parallax problem, such displays are unacceptable for direct viewing and have generally been limited to projection systems.

A further problem associated with stacked LCD displays involves depth of focus. Since the separate filter components are physically offset (i.e. misregistered), the controlled colors of light are focused at differing depths in the projected image. This difference in focus of different colored light in a projected image can be detected by a viewer. A solution to this problem involving the use of a stacked assembly of dichroic mirrors, one for each controlled primary color (e.g. red, green and blue) is described by Mathewson in U.S. Pat. No. 5,184,234. Light projected through the display is reflected from the stacked dichroic mirror assembly onto a viewing screen such that the offset reflections of each primary color by the stacked mirror assembly corrects the perceived depth of focus problem in the viewed image. However, with prior stacked LCD displays which employ filter components with overlapping stopbands to improve contrast as described above, the color of light controlled by one filter component in the display may be influenced by other filter components. When such a display's depth of focus is compensated by the stacked dichroic mirrors, this cross interference of other layers with the controlled color results in a ghosting effect or apparent shadow to objects in the image.

The present invention provides optical notch filters of novel configuration which apply circular polarization techniques and materials to produce more effective filter shapes. The resulting optical notch filters have filter shapes with better transmitting passband regions, better attenuating stopband regions, and narrower transition regions than the prior filter components described above. In general, the optical notch filters include a first element which selectively imparts a first or second circular polarization to transmitted light in a predetermined spectral region ("controlled band"), and a second element which likewise passes light of only one circular polarization within the controlled band.

In accordance with one aspect of the invention, the optical notch filter comprises a variable zero/half wave retarder element interposed between circular polarizers. Incident light in the controlled band is polarized to a first circular polarization by the first of the circular polarizers. The variable retarder is switchably responsive to an applied signal between zero retardation and half wave retardation so as to selectively vary the circular polarization of light exiting the retarder. The second circular polarizer transmits only one circular polarization of light in the controlled band while substantially completely attenuating the other. The optical notch filter thus provides selective filtering of light in the controlled band.

In accordance with another aspect of the invention, the variable zero/half wave retarder of the optical notch filter comprises an LCD that exhibits an electronically controllable birefringent effect, such as a super twisted nematic LCD (STN-LCD) element. The STN-LCD's electronically controllable birefringent effect is used to selectively vary the circularly polarized entering light between right and left handed circular polarizations. Cholesteric liquid crystal (CLC) polarizers are used as the first and second circular polarizers. The STN-LCD element and the CLC polarizers are tuneable to a particular spectral region and provide an optical notch filter with a particularly selective filter shape.

In accordance with a further aspect of the invention, a color LCD display is formed from a stacked assembly of the optical notch filters, each of which operates to selectively attenuate light in a respective portion of the visible spectrum. In preferred embodiments of the invention, the optic notch filter components of the stacked assembly are constructed with the STN-LCD and CLC polarizer layers supported on plastic substrates. With such a construction, the stacked assembly can be formed sufficiently thin to avoid parallax at acceptably large direct viewing angles without the need for collimating lenses. The resulting color display is lightweight and brighter, being particularly useful in low weight, low power consumption applications, such as for portable computer displays.

Another advantage of the stacked assembly formed according to this aspect of the invention is that with the improved filter shape of the filter components, there is much less cross-talk or interference with a filter component's controlled color by the other filter components in the stacked assembly. Consequently, when the depth of focus of a display formed with the stacked assembly is compensated by stacked dichroic mirrors, there is little or no perceived ghosting effect.

In accordance with another aspect of the invention, the display formed from the stacked assembly of notch filter components is configured to doubly analyze each color band, thereby improving display contrast.

In accordance with yet another aspect of the invention, a circular polarizer of the optic notch filter component is operated in conjunction with a linear polarizer and retarder element to more completely attenuate light in the filter component's spectral region.

In accordance with yet another aspect of the invention, the optical notch filter component is configured to operate uniformly across a broad spectral band in at least one of its birefringent states. This achromatic operation produces a more uniform attenuation or transmission of light in the filter component's spectral region. In one embodiment, the optical notch filter component comprises oppositely handed circular polarizers so that the achromatic operation is produced when attenuating light in the filter component's spectral region. A stacked assembly of filter components according to this embodiment produce a more uniform black.

In accordance with still another aspect of the invention, a selectively circularly polarizing element is provided which comprises a linear polarizer, a switchably birefringent layer (such as a STN-LCD layer), and a second birefringent layer. Incident light projected through the element is first linearly polarized to a predetermined orientation by the linear polarizer. When the light then passes through the birefringent LCD layer, elliptically polarized light results. (STN-LCD layers, in particular, tend to produce such a result.) The elliptically polarized light can then be adjusted to a circular polarization of light with the second birefringent layer. The birefringent LCD layer can be selectively operated to produce two different elliptical polarizations of light which, when passed through the second birefringent layer, result in right or left handed circular polarizations. The selectively circularly polarizing element thus formed can be used in conjunction with a circular polarizer to operate as a notch filter.

Additional features and advantages of the invention will be made apparent from the following detailed description of a preferred embodiment, which proceeds with reference to the accompanying drawings.

DETAILED DESCRIPTION OF THE PREFERRED EMBODIMENTS

Figure 1:
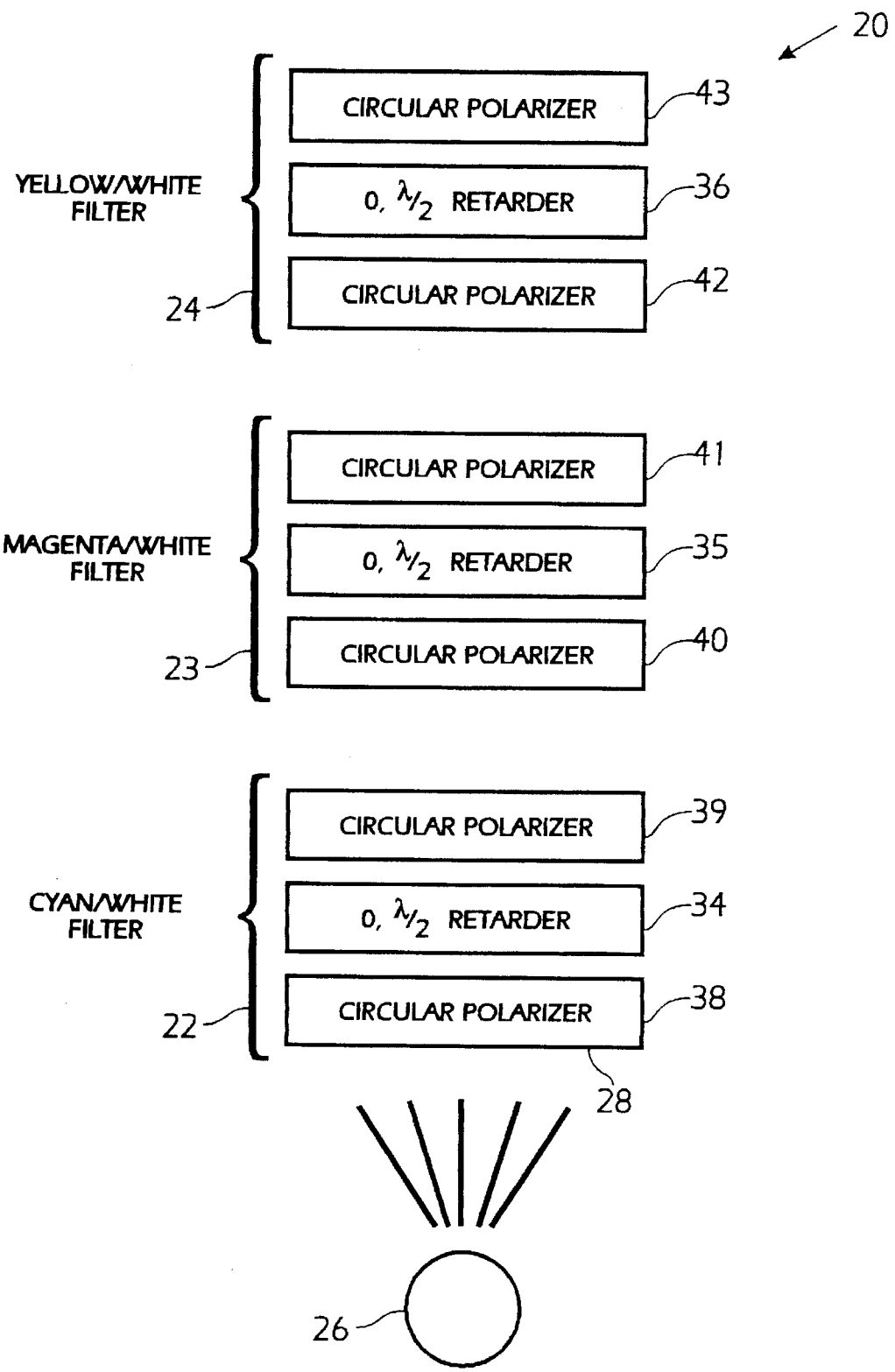
FIG. 1 is a schematic diagram of a color LCD display subassembly according to one embodiment of the present invention.

With reference to FIG. 1, a basic subassembly 20 of a color LCD display according to one embodiment of the present invention comprises series stacked first, second and third optical notch filter components 22–24. The subassembly 20 can be incorporated in various configurations of color LCD display projection and direct view systems. A number of such projection and direct view system configurations are disclosed in Conner et al., U.S. Pat. No. 5,050,965, the disclosure of which is incorporated by reference as if fully set forth herein. Additional applications of the subassembly 20 will be readily apparent to one of ordinary skill in the art.

Light from a light source 26, such as an overhead projector or backlight, enters the subassembly 20 from one side 28 and exits from another 29. Preferably, the entering light is white or polychromatic light generally composed of light of all wavelengths in the visible spectrum. (In general, the visible spectrum includes light of wavelengths between 400 and 700 nm.) Light exiting the subassembly 20, however, is controllably colored by the operation of the optical notch filter components 22–24. Colored light is the result of passing only light energy in one or more regions of the visible spectrum. The optical notch filter components 22–24 produce colored light by selectively subtracting or attenuating light energy of the entering light in one or more regions.

Figure 2:
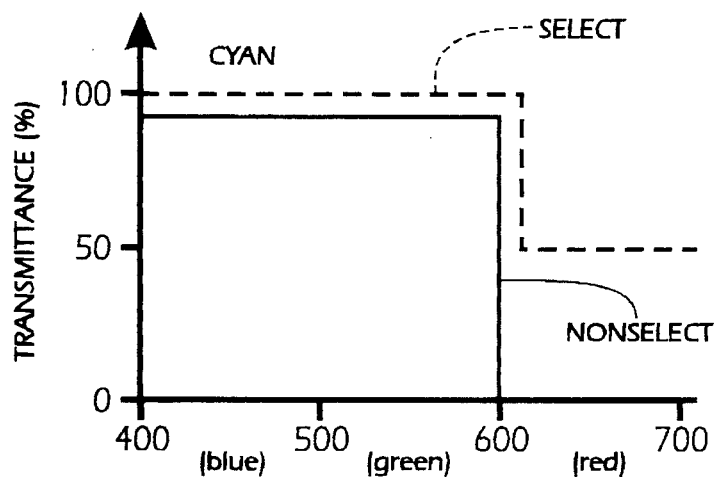
FIGS. 2–4 are spectrophotometer plots showing ideal light transmission characteristics for three optical notch filter components used in the display subassembly of FIG. 1 when in their selected and nonselected states.
Figure 3:
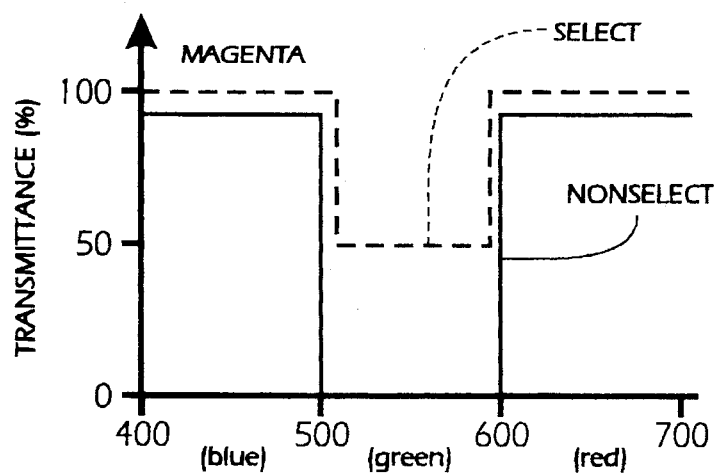
Figure 4:
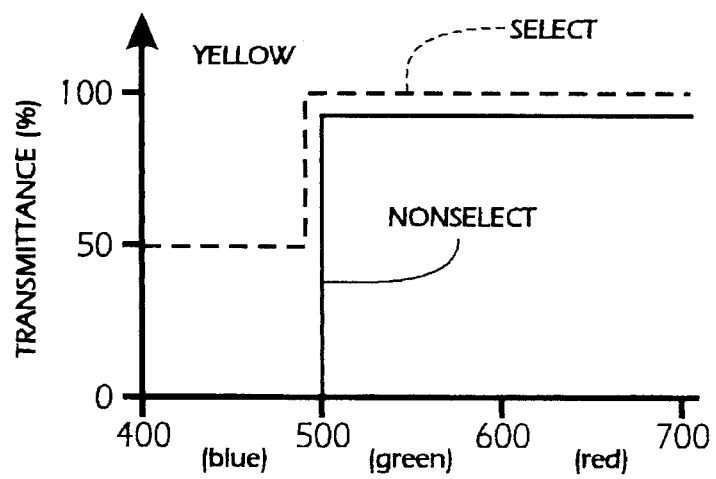

Referring to FIGS. 2–4, in preferred embodiments of the invention, the optical notch filter components 22–24 selectively attenuate light in spectral regions corresponding to the primary colors, red, green, and blue. For convenience of discussion, the primary colors are generally assigned spectral regions of the wavelengths 400–500 nm for blue, 500–600 nm for green, and 600–700 nm for red. The visible spectrum, however, can be otherwise divided. Also, in other embodiments of the invention, the subassembly 20 can comprise any number of optical notch filter components which attenuate light energy in variously segregated subregions of the spectrum. Preferably, however, the subassembly 20 includes notch filter components which are capable of being operated together to selectively attenuate substantially all of the visible spectrum (400–700 nm) to form black.

In FIGS. 2–4, the ideal operation of the optical notch filter components 22–24 is shown. Each of the optical notch filter components has two states, selected and nonselected. In their nonselected state, the optical notch filter components operate to attenuate light energy in their respective spectral region and transmit light outside the region. Optical notch filters which operate to attenuate light in their respective spectral region when in their nonselected state are referred to herein as operating in a normally black mode. Those transmitting light in their respective spectral region when in their nonselected state are referred to herein as operating in a normally white mode.

As mentioned above, each of the optical notch filter components 22–24 selectively attenuates light energy in a particular spectral region corresponding to one of the primary colors. More specifically, one of the optical notch filter components selectively attenuates light in the red region (600–700 nm) as shown in FIG. 2. Such a red attenuating filter component is generally referred to as a cyan filter since when red is subtracted from white light, cyan colored light results. Of course in its selected state, this optical notch filter component transmits all colors, forming white light. (In actual practice, this filter component transmits only approximately one half the red light when in the selected state because it must initially polarize red light for it to be selectively attenuated. Polarization entails discrimination of half the incident light, assuming a randomly polarized source.) Since the filter component forms either cyan or white light, it is generally referred to as a cyan/white filter. Another of the optical notch filter components selectively attenuates green light (500–600 nm) as shown in FIG. 3 and, therefore, operates as a magenta/white filter. A third operates as a yellow/white filter because it selectively attenuates blue light (400–500 nm) as shown in FIG. 4. Again, although sometimes counter-intuitive, filters are herein denoted by the colors they transmit, not the colors they attenuate.

Referring again to FIG. 1, the optical notch filter components 22–24 are illustrated having the particular order of cyan/white filter component 22, magenta/white filter component 23, and yellow/white filter component 24. However, this particular order is not required. The filter components 22–24 can be stacked in any arbitrary order in the subassembly 20.

The series combination of the filter components 22–24 produces exiting light of a particular color by attenuating various combinations of the primary colors as entering light passes through the subassembly 20. For example, to produce blue exiting light, both red and green but not blue must be attenuated in the subassembly. This is done by nonselecting the cyan/white and magenta/white filter components 22, 23 to attenuate red and green, and selecting the yellow/white filter component 24 so that blue is not attenuated. By selecting and nonselecting various combinations of the filter components, the colors black (no filters selected), white (all filters selected), red (cyan filter selected), green (magenta filter selected), blue (yellow filter selected), cyan (magenta and yellow filters selected), magenta (cyan and yellow filters selected), and yellow (cyan and magenta filters selected) can be produced. A full range of additional colors can be produced by applying known grey shading techniques. In other embodiments of the invention, additional colors also can be produced by providing additional optical notch filter components which further subdivide the visible spectrum (e.g. a stacked assembly of seven filter components which attenuate light in seven separate subregions of the visible spectrum yields seven degrees of freedom in color combinations).

To produce a color image, each of the filter components 22–24 comprises a plurality of pixels that can be individually selected and nonselected to attenuate the light passing therethrough in a particular spectral region. Each filter component's pixels are aligned with corresponding pixels in the other filter components. By selecting and nonselecting corresponding aligned pixels of the filter components in a particular combination, exiting light of a particular color for a corresponding pixel of the color image is produced. The colors of other pixels in the color image are produced in a like manner by selecting corresponding aligned pixels of the filter components in suitable combinations.

Operation of the filter components 22–24 is based on principles of polarized light. Discussion of their operation, therefore, proceeds with a brief summary of these principles.

In general, light exhibits wave-like characteristics. As a beam of light travels, it exhibits a characteristic oscillating electromagnetic field transverse to its direction of travel. The wavelength or wavelengths of the light beam's waves determines the color of the light beam as described above (e.g. red light generally has wavelengths of 600–700 nm).

Polarized light is composed of light whose waves are identically oriented. Polarized light can be either elliptical, linear, or circular. Linearly polarized light exhibits a wave oriented along a fixed axis transverse to the light beam's direction of travel. Circularly and elliptically polarized light exhibit waves whose orientation rotates as the light beam travels. In the case of circularly polarized light, the wave describes a right or left handed helix. With elliptically polarized light, the wave describes an elliptical path.

All three forms of polarized light can be described in terms of two orthogonal linearly oriented component waves. When the linear component waves are in phase, the light is linearly polarized. (The relative magnitudes of the linear component waves determines the orientation of the linearly polarized light.) When the linear component waves are separated in phase by ninety degrees and are equal in magnitude, the light is circularly polarized. Otherwise, the light is elliptically polarized. Alternatively, polarized light can be described as having two opposite handed circularly polarized component waves, the relative phases and magnitudes of which determine the light's polarization. These and other principles of polarized light are well-known and described in more detail by, inter alia, Kliger et al., "Polarized Light in Optics and Spectroscopy," Academic Press, Inc., San Diego, 1990.

In the embodiment of the invention illustrated in FIG. 1, the optical notch filter components 22–24 each comprises an electronically switchable variable retarder 34–36 interposed between two adjacent circular polarizers 38–43. One of the circular polarizers 38, 40, 42 in each of the filter components serves as an entrance polarizer, which circularly polarizes entering light in the filter component's respective spectral region. Each filter component's retarder 34–36 operates to controllably vary the circularly polarized entering light in the particular spectral region between oppositely-handed circular polarizations. The other circular polarizers 39, 41, 43 in filter components 22–24 each serves as an exit analyzer, which transmits only one of the circular polarizations of the entering light in the controlled spectrum while reflecting the other circular polarization. Depending on which circular polarization is imposed by a filter component's entrance polarizer 38, 40, 42, and depending on whether this polarization is reversed by the retarder 34–36, the light in the controlled spectrum is either transmitted or reflected by the filter component's exit analyzer 39, 41, 43. Gray shading or varying the amount of attenuation of the light in the controlled spectrum to produce an additional range of colors can be achieved by retarding the phase angle of one of the polarizations of the light relative to the other, between 0 and lambda/2.

Figure 5:
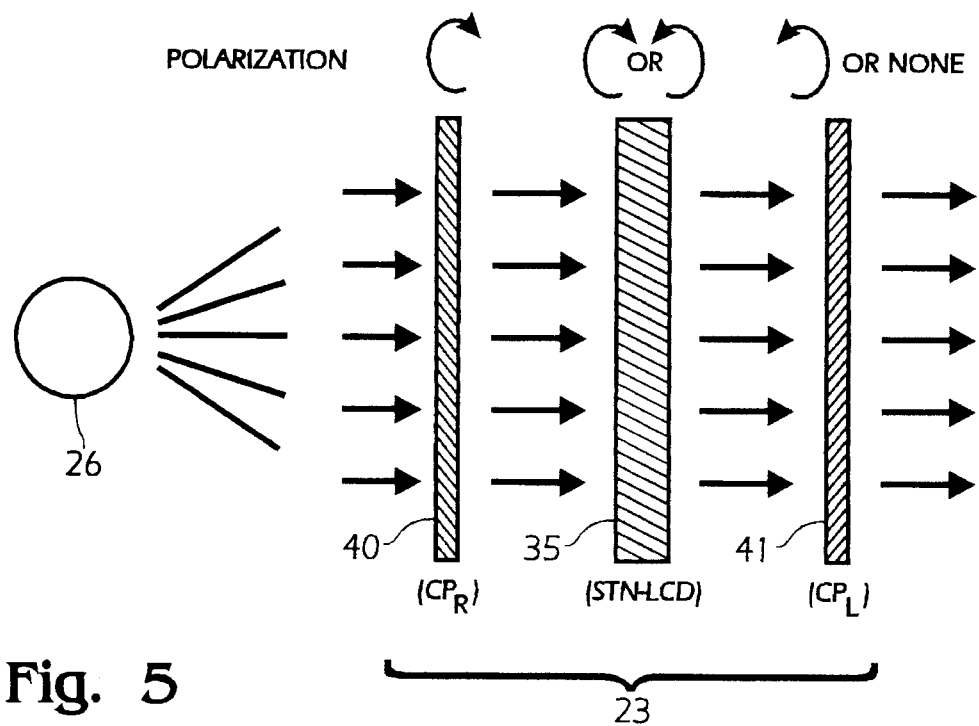
FIG. 5 is a schematic diagram of a magenta/white optical notch filter component in the color LCD display subassembly of FIG. 1.

Referring to FIG. 5, for example, in the magenta/white optical notch filter component 23, the light source 26 projects unpolarized white light on the entrance circular polarizer 40. The entrance polarizer 40 circularly polarizes entering light in the green spectral region (500–600 nm) with, in the illustrated embodiment, a right-handed circular polarization (represented by the clockwise arrow in FIG. 5). The variable retarder 35 is electronically controlled to vary the polarization of the green light between right and left handed circular polarizations (represented by alternate clockwise and counter-clockwise arrows). The exit analyzer 41 transmits, in the illustrated embodiment, green light of only the left handed circular polarization (represented by the counter-clockwise arrow). Accordingly, by controlling the circular polarization of the green light with the retarder 35, the green light will be either transmitted or blocked. Blue and red light are substantially completely transmitted by the magenta/white filter component 23.

Preferably, the entrance polarizers 38, 40, 42 and exit analyzers 39, 41, 43 of each filter component 22–24 are cholesteric liquid crystal (CLC) polarizers. CLC polarizers are formed from cholesteric liquid crystal materials. When properly oriented in their cholesteric liquid crystal state, the molecular structure of these materials acts in combination to substantially completely reflect one circular polarization component of incident light in a characteristic spectral region. Light in the characteristic spectral region of an oppositely-handed circular polarization and light outside the characteristic spectral region are substantially completely transmitted.

The polarization and reflection band of CLC polarizers can be adjusted by varying the composition of CLC material in the polarizer and by varying the temperature of photo cross linking if the material is a photo curing polymer. Accordingly, CLC polarizers suitable for use as the polarizers 38–43 can be formed to reflect a desired circular polarization of light in a desired spectral band (e.g. right circularly polarized light in the green spectrum from 500–600 nm for the entrance polarizer 40 and left circularly polarized green light for the exit analyzer 41) by properly selecting one or more LC polymer materials and photo cross linking the materials at an appropriate temperature. Suitable CLC polarizers can be formed from appropriate mixtures of the cholesteric liquid crystal polymers, designated as LC silicones CC3939 and CC3767, available from Wacker Chemie, GmbH of Munich, Germany.

Another source of CLC polarizers is Hoffmann La Roche Corporation. Their materials 194R and 194L, for right- and left-handed, reflect wavelength regions that are independent of their temperatures, and are tunable to the red by addition of nematic LC material 8104. These are similar to Roche materials 6415L and 6420R that are discussed in the *Japanese Journal of Applied Physics*, Volume 29, page 1974, printed in 1990.

As described above, the retarder 35 of the filter component 23 is electronically controllable to vary the polarization of the right circularly polarized green light between right and left handed circular polarizations. This is accomplished by retarding the phase of one linear component of the right circularly polarized green light relative to another orthogonal linear component by zero or a half wavelength, respectively. As described above, circularly polarized light is composed of two orthogonal linear components with equal magnitude and a ninety degree phase shift. Retarding one of the components relative to the other alters the phase shift. Retardation of one of the components by a half wavelength relative to the other produces a phase shift of ninety degrees in the opposite direction. This phase shift is equivalent to reversing the handedness of the circular polarization. Thus, retarding one linear component of right circularly polarized light by half a wavelength (or, equivalently, by a half wavelength plus any multiple of one wavelength) produces left circularly polarized light. Of course, retardation of zero wavelengths (and other multiples of one wavelength) effects no change in the polarization of circularly polarized light.

To switch between circular polarizations of the circularly polarized entering light, the variable retarder 35 is not required to have any particular axial orientation relative to the circular polarizers 40, 41. By contrast, in the switchable filter components described in the background of the invention which operate with linearly polarized light, an LCD panel which controls switching between linear polarizations of the light must be at a particular axial orientation relative to adjacent dichroic linear polarizers (commonly 45 degrees for birefringent effect type LCD displays).

The retarder 35 preferably comprises a super twisted nematic LCD (STN-LCD) panel which is tuned and compensated to controllably retard green light by zero and half of a wavelength. In general, STN-LCD panels have an active STN-LCD layer formed with a liquid crystal material that exhibits a birefringent effect which varies depending on the tilt angle of the material. (Birefringence is an optical phenomenon in which light polarized in a plane parallel to an axis of the material propagates at a speed different than light polarized in a plane orthogonal to the axis.) The tilt angle of the liquid crystal material is controllably switchable between two states by applying an appropriate voltage to the panel (e.g. a selected state where a voltage above a threshold level is applied and a nonselected state where the applied voltage is below the threshold). The retardation of the STN-LCD panels in the two states can be "tuned" and "compensated" to produce substantially zero retardation of light in a particular spectral region in one state and a half wavelength retardation of the light in the other state.

For example, a typical STN-LCD panel suitable for use as the retarder 35 of the magenta/white filter component 23 in FIG. 5 has an active layer composed of a liquid crystal material whose molecules are at a tilt angle of approximately 1 to 5 degrees when a voltage of about 1.41 volts is applied in its nonselected state. In this state, the active layer exhibits a retardation $\delta_{ns}$. $\delta_{ns}$ is characteristic of the STN LCD panel and depends upon the total twist angle, the thickness, and birefringence of the liquid crystal layer. See, for example, T. Scheffer and J. Nehring, "Supertwisted Nematic (STN) LCDs" SID Seminar Lecture Notes, Volume 1, M71-M7/63. In the selected conditions, the active layer exhibits a different retardation, $\delta_s$. Increasing the applied voltage above a threshold voltage of approximately 1.5 volts to about 1.56 volts causes the molecules to tilt to an angle of approximately 45 degrees. In this "selected" state, the active layer exhibits a minimum birefringence.

To form an LCD panel suitable for use as a variable zero/half wavelength retarder, the STN-LCD layer must be tuned so that the retardation of the layer differs by a half wavelength between its two states as follows:

$$\frac{\lambda}{2} = d(\delta_{ns} - \delta_s) \tag{1}$$

where lambda is the wavelength of light desired to be retarded by zero/half wavelengths, the subscript ns denotes the non-selected state, and the subscript s denotes the selected state. For example, the above described active STN-LCD layer can be tuned so that the retardation is approximately 775 nm in the non-selected state and 500 nm in the selected state. The difference in retardation between the two states is 275 nm, or half the wavelength of green light.

Then, to effect the desired overall retardation of green light in the two states (e.g. zero and half wavelength), the STN-LCD panel also is compensated by including one or more passive retarder elements, such as a retardation film or non-variable LC retarder. Essentially, such passive retarder elements add a fixed offset to the retardation provided by the active STN-LCD layer to yield a desired net retardation.

When compensated, the STN-LCD panel should provide a net retardation of an integer multiple of the controlled wavelength of light in one state and an odd multiple of half the controlled wavelength in the other state as shown in the following equations:

$$\delta_a d + R_c = k\lambda \quad (2)$$

$$\delta_b d + R_c = \frac{(2k+1)\lambda}{2} \quad (3)$$

where $R_c$ is the total retardation of the passive retarder elements, subscript a denotes one of the selected or non-selected states, subscript b denotes the other state, k is an integer, and lambda is the controlled wavelength of light. (Note that an STN-LCD panel which is compensated according to equation (2) to produce a net retardation of an integer multiple of the controlled wavelength in the non-selected state operates in the normally black mode in a filter component having oppositely handed polarizers. An STN-LCD panel compensated according to equation (3) to produce a net retardation of an odd multiple of half the controlled wavelength in the non-selected state operates in the normally black mode when between same handed polarizers.)

For example, the above described exemplary STN-LCD panel can be compensated to yield effectively zero retardation in its nonselected state by layering a passive retarder element adjacent to the active STN-LCD layer. In this configuration, the retardation of the passive retarder effectively compensates that of the active STN-LCD layer for a net zero retardation. In the STN-LCD panel's selected state, the active STN-LCD layer and passive retarder layer yield a net half wave retardation of green light. Alternatively, two passive retarder elements can be layered, one on each side of the STN-LCD panel, so that each reverses half the STN-LCD panel's nonselected state birefringence.

Other STN-LCD panels can be similarly tuned and compensated for use as the variable retarders 34, 36 of the filter components 22, 24 to operate with red and blue light, respectively. Although STN-LCD panels are preferred, the variable retarders 34–36 also can be realized using other types of LCD panels, such as twisted nematic, super-homeotropic, and ferroelectric liquid crystal type panels.

Figure 6:
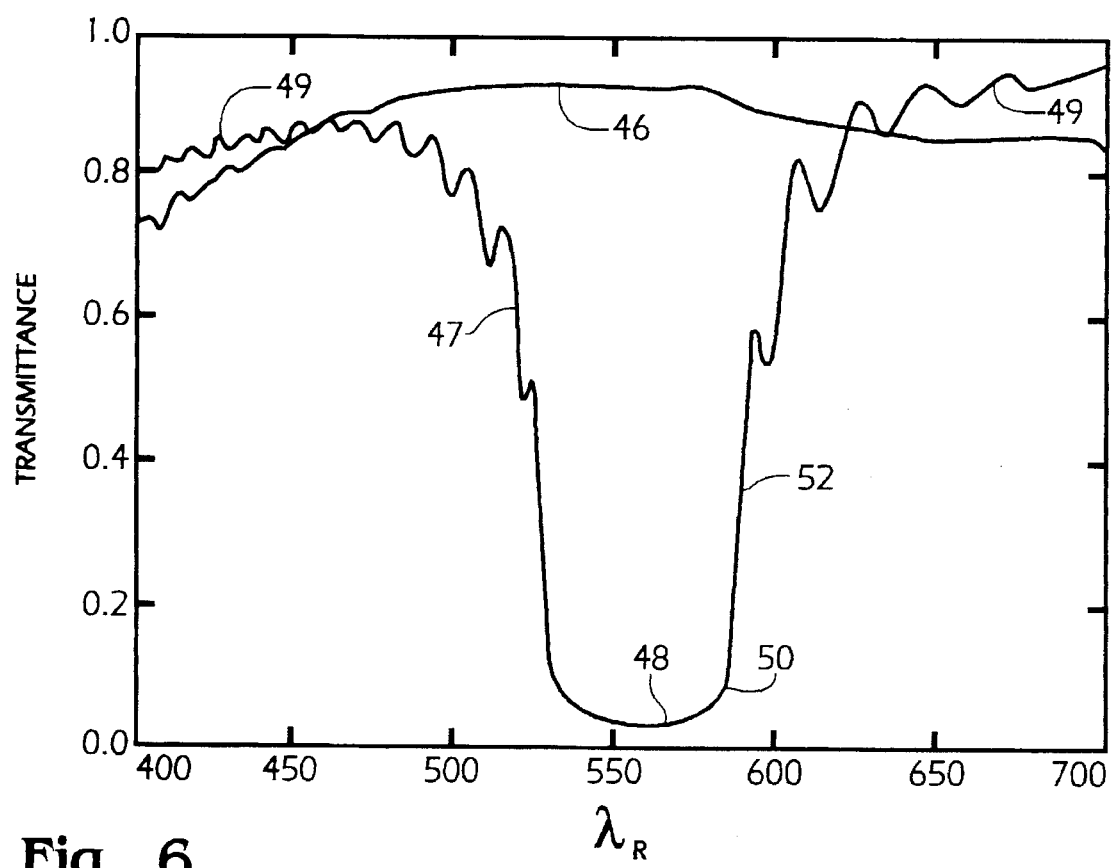
FIG. 6 is a normalized, spectrophotometer plot of a magenta CLC polarizer.
Figure 7:
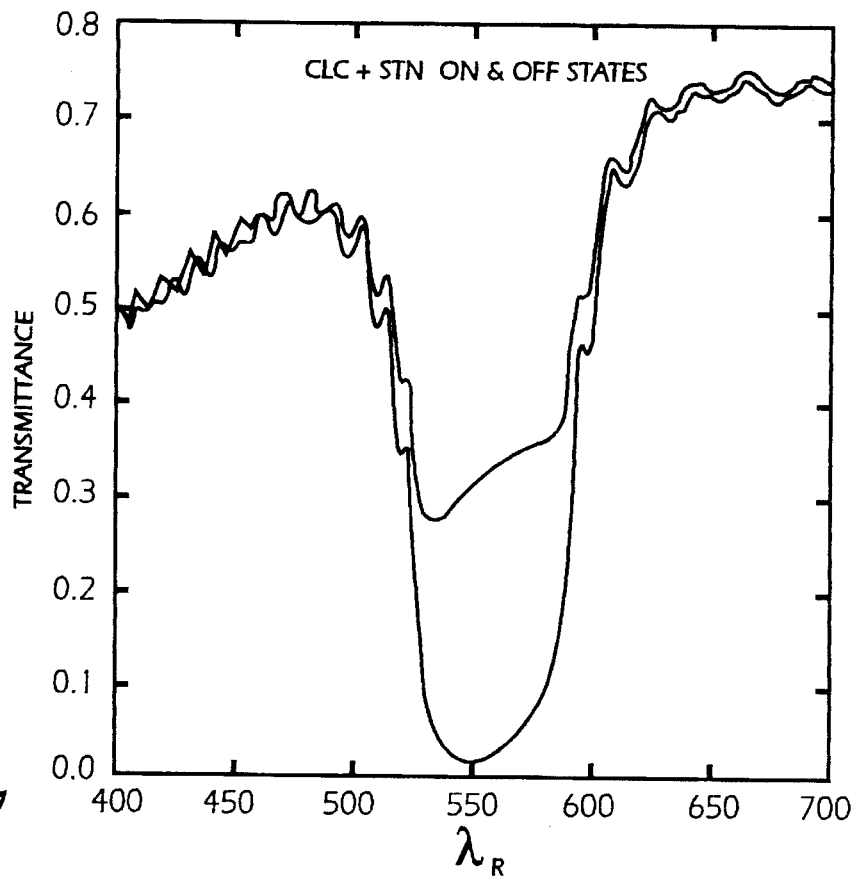
FIG. 7 is a spectrophotometer plot of a magenta/white filter component of the type shown in FIG. 5.

The effectiveness of optical notch filter components formed according to the invention is illustrated by the spectrophotometer plots in FIGS. 6 and 7. In FIG. 6, spectrophotometer plots 46, 47 show the transmittance of left and right handed circularly polarized light for a magenta CLC polarizer. The plots 46, 47 show that CLC polarizers can be formed to provide a particularly color band selective spectral response. Light having one circular polarization (plot 46) is nearly completely transmitted in all three color bands by the CLC polarizer. The other circular polarization (plot 47) is substantially reflected within a particular color band (the "reflection band") 48 and substantially transmitted outside the color band (i.e. in the "transmission bands" 49). Between the reflection and transmission bands 48, 49, the spectral response has a very sharp and steep transition (in comparison with typical stretched plastic, linear sheet polarizers). The spectral response remains desirably flat in the reflection band region 48 up to a "toe" 50, then rises along a steep skirt 52 to the transmission band 49.

When the CLC polarizer is used as described above in an optic notch filter component of the type shown in FIG. 5, these above described characteristics of the spectral response of the CLC polarizer provides improved color performance over dyed linear polarizers. Of particular significance is the sharp toe 50 of the spectral response. With a relatively flat reflection band 48 and sharp toe 50, the CLC polarizer 41 effectively attenuates light in the filter component's controlled color band when the light is given the appropriate circular polarization by the variable retarder 35 and entrance polarizer 40. By contrast, a filter component whose polarizer has a "weak" toe or more gradual transition from stop band to stop band skirt will leak a significant amount of light energy in this region of its stop band, thereby decreasing the contrast of any subtractive color display formed with such filter components. A sharp toe is particularly significant when the stop bands of filter components 22–24 do not overlap, as is the case in the illustrated display subassembly 20.

Also significant is the steepness of the polarizer's skirt 52 and the difference in transmissivity between the reflection and transmission bands 48, 49. The illustrated magenta CLC polarizer, for example, has a skirt 52 with a steep slope that changes from approximately 12% transmission of light at 590 nm wavelength to approximately 60% transmission at 600 nm (a change of over 45% in transmissivity over a narrow spectral range of only 10 nm). Filter components formed with such polarizers result in a display subassembly with much better transmittance compared with those made from dyed linear polarizers.

The transmittance of an actual magenta/white notch filter component formed with CLC polarizers and an STN-LCD variable retarder is illustrated by the spectrophotometer plots 54, 55 in FIG. 7 of the component's selected and non-selected states, respectively. Although the spectral response of this actual optical notch filter component is not perfect, it compares favorably to that of the ideal magenta notch filter shown in FIG. 3. (Because of the particular STN-LCD panel used as the variable retarder in the filter component which had less than desired performance in switching between circular polarizations, the spectral response shape is somewhat degraded from that of the CLC polarizer alone (FIG. 6).)

Referring again to FIG. 5, the variable retarder 35 can generally be tuned so that its birefringent effect is substantially achromatic in one of its two states. This feature of the variable retarder's performance is applied in the illustrated embodiment of the invention to provide a more uniform attenuation in the filter component's stop band.

More specifically, in the illustrated filter component 23, the variable retarder 35 is tuned to effect zero retardation of green light when in its nonselect state. Zero retardation is inherently achromatic because all wavelengths of light are affected substantially equally.

By contrast, when the variable retarder 35 is in its selected state, it retards only one particular wavelength of the incident light by exactly one half wavelength. Other wavelengths are retarded either slightly more or slightly less. For example, to effect substantially half wave retardation of green light, the compensated variable retarder 35 may retard one linear component of incident light by approximately 275 nm relative to another orthogonal linear component. This effects exactly half wave retardation of green light with a wavelength of 550 nm. Wavelengths of light less than 550 nm are retarded somewhat more than half a wavelength. Light having wavelengths more than 550 nm are retarded somewhat less. In general, variable retarders can be tuned to have a birefringent effect which is substantially achromatic (invariant or less variant in response to light of differing wavelengths) in only one of its states.

The result of the variable retarder's achromatic operation in its nonselected state is that the filter component 23 more uniformly attenuates green light across its stopband, producing a sharper toe in the filter component's stop band skirt. The right handed circular polarization of the green light transmitted by the entrance polarizer 40 remains substantially unchanged by the variable retarder in its nonselected state regardless of its particular wavelength. Consequently, the green light is more completely reflected by the exit analyzer 41 across the filter component's stop band. In the selected state, however, some wavelengths of the green light are retarded somewhat more or less than a half wavelength. As a result, the polarization of these wavelengths is not completely reversed to the left handed circular polarization necessary to be transmitted by the exit analyzer 41.

In the filter component 23, the achromatic operation of the variable retarder 35 in its nonselect state produces a more uniform attenuation of light in its controlled spectral region. To produce more uniform attenuation from the variable retarder's zero retardation, the filter component 23 also must employ opposite handed circular polarizers as its entrance polarizer 40 and exit analyzer 41. Alternatively, by employing same handed circular polarizers, the filter component can be made more uniformly transmitting in its controlled spectral region. Usually, the more uniformly attenuating filter components are preferred because, in a stacked subassembly, such filter components produce a more uniform black and, consequently, higher contrast. (In other words, non-uniform attenuation is more apparent to the viewer than non-uniform transmission).

Figure 9:
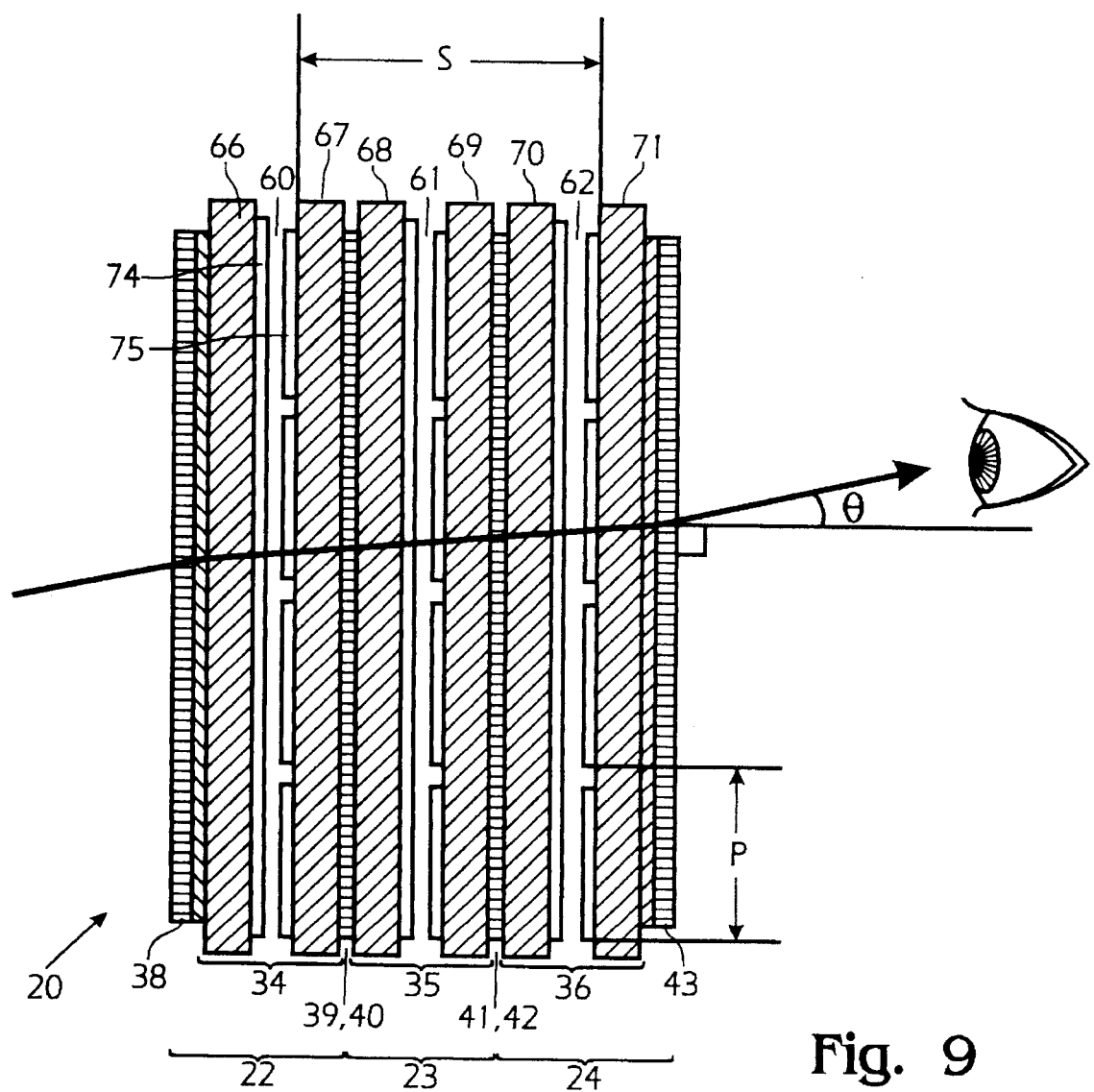
FIG. 9 is a more detailed schematic diagram of a color LCD display subassembly of the type shown in FIG. 1 illustrating the preferred plastic substrate construction.

Referring to FIG. 9, the display subassembly 22 is preferably constructed with the active STN-LCD layers 60–62 of the variable retarders 34–36 supported on relatively thin substrates 66–71 such that the apparent optical thickness between LC layers 60 and 62 (effectively, d=s/1.5) is less than the pixel pitch (p). (Also supported on the substrate are column electrodes 74 and row electrodes 75 for applying electrical signals to individual pixels of the filter components.) In accordance with the invention, the thin substrates 66–71 can be constructed of plastic such as PMMA, PVA, and tri-acetate. Alternatively, a micro-sheet of glass having a thickness less than 0.5 mm can be used. Suitable plastic substrates are available from Seiko-Epson, Corp. of Toyoshina, Japan and Ricoh, Corp. of Yohohama, Japan. Many plastic materials suitable for use as the substrates 66–71 are, themselves, birefringent. In fact, the substrates may comprise one or more layers of stretched plastic retarder film. (Where two or more layers are used as a substrate, they can be layered with their fast axes at a distinct angle, i.e., not axially aligned, in order to effect a more achromatic compensation of the active LCD layer.) Thus, substrates formed of such materials also may serve as compensating retarders for the active LCD layer, obviating the need for additional passive layers in each filter component 22–24 to compensate the active LCD layer and, thus, further reducing the thickness. (In the illustrated embodiment, compensating retarder films 78, 79 are used only on the outside surfaces of the outer variable retarders 34, 36 to minimize the total stacked assembly thickness (s).)

When the effective optical thickness of the stacked filter components is less than the pixel pitch, the stacked subassembly 20 provides an acceptably large direct viewing angle. To illustrate, the following Table 1 lists the external viewing angle at which the misregistration error relative to the center active LCD layer 61 is half the pixel's width (p/2). The external viewing angle (θ) is the angle at which the subassembly is viewed relative to an axis normal to the subassembly.

TABLE 1

| External Viewing Angle Versus Pixel Pitch. | | |
|---|---|---|
| Pixel Pitch (p) (microns) | Internal Angle arctan (p/s) | External Angle arctan (p/d) |
| 100 | 12.5° | 18.4° |
| 200 | 24.0° | 33.7° |
| 300 | 33.7° | 45.0° |
| 400 | 41.6° | 53.0° |
| 500 | 48.0° | 59.0° |

In Table 1, the thickness (s) of the stacked filter components (i.e. the distance between the first and last active LCD layers) is assumed to be about 450 microns. (Typical plastic substrates suitable for use as the substrates 67–70 are approximately 100 microns thick. The CLC polarizers are typically 10 microns thick. Thus, the thickness (s) can be approximately 450 microns in the illustrated embodiment.) The effective optical thickness (d) of the stacked filter components for computing the external angle is equal to the actual thickness divided by the index of refraction (e.g. s/1.5 or approximately 300 microns). From Table 1, it will be apparent that when the pixel pitch (p) of the stacked subassembly 20 is greater than the effective thickness (d) (i.e. p greater than approximately 300 microns), an acceptably large external viewing angle of greater than 45 degrees is provided. (A pixel pitch of 300 microns corresponds to a 9" diagonal display with a 640×480 spatial resolution.) A pixel pitch (p) greater than twice the effective thickness (2d) is sufficient for an external viewing angle of about 30 degrees, which is acceptably large in some applications.

In the embodiment of the display subassembly 20 illustrated in FIG. 9, the CLC material of the circular polarizers 39–42 also performs the function of optically coupling the notch filter components 22–24. To increase its adhesive strength, the CLC material is desirably mixed with an adhesive material such as a polymer. Preferably, such a mixture is at least 80% CLC material by volume for adequate performance as a circular polarizer. A UV curable epoxy or thermally cured epoxy can be used as the adhesive material to further facilitate the subassembly's manufacture.

Further, as illustrated in FIG. 9, a single CLC layer can function suitably as the exit analyzer 39, 41 of one of the filter components 22, 23 and the entrance polarizer 40, 42 of the adjacent filter component 23, 24, respectively. Such a layer of CLC material must be designed to reflect one circular polarization of light in the spectral region of both adjacent filter components. For example, the CLC layer serving as the polarizers 39, 40 reflects one circular polarization in both the red and green spectral regions of the filter components 22, 23, respectively.

Accordingly, a preferred method of manufacturing the CLC polarizers 38, 43 in the subassembly 20 is to mix a CLC polymer with a UV initiator and apply the mixture to a surface of a plastic substrate or compensating retarder film with a roller by screen printing or otherwise. If the mixture is intended to optically couple the substrates of two adjacent filter components, the second plastic substrate is placed on top. The color performance of CLC materials is thermally sensitive. By then heating the mixture to a temperature where a desired color performance is achieved and exposing the material to ultraviolet (UV) radiation, the color performance is "locked in." The UV exposure simultaneously polymerizes the mixture and binds the plastic substrates. (To temperature compensate the CLC polarizer, a CLC material whose color performance changes negatively with increased temperature can be mixed with one that changes positively to effect a net or balanced temperature sensitivity of zero. This is the case of the Hoffmann La Roche materials previously described.)

Figure 10:
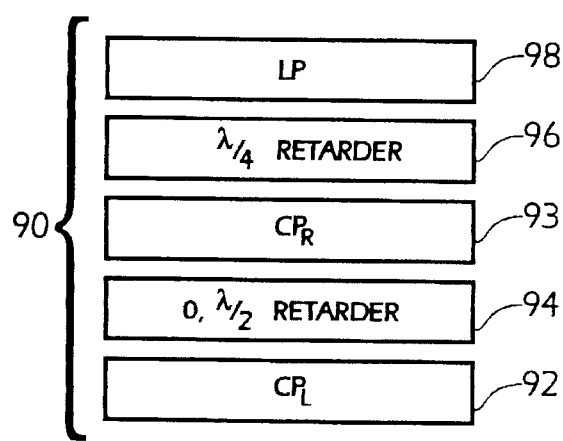
FIG. 10 is a schematic diagram of a magenta/white optical notch filter component according to a second embodiment of the invention.

Turning now to FIG. 10, a magenta/white optical notch filter component 90 according to a second embodiment of the invention comprises circular polarizers 92–93, and an electronically switchable variable retarder 94. The circular polarizers 92–93 and the variable retarder 94 operate similarly to the optical notch filter component 23 shown in FIG. 5 to selectively attenuate green light. When the retarder 94 is nonselected for zero wavelength retardation, the left circularly polarized green light transmitted by the entrance circular polarizer 92 is blocked by the exit circular polarizer 93, which reflects left circularly polarized green light. In an actual filter component of this type, the exit circular polarizer 93 may not completely reflect left circularly polarized green light. This failure results in incomplete attenuation of light in the filter component's stop band.

To enhance its stop band attenuation, the filter component 90 additionally comprises a quarter wave retarder 96, and a linear polarizer 98. The quarter wave retarder 96 may be a retardation film having a thickness suitable to retard light in the stopband region of the filter component 90 by approximately a quarter wavelength. By retarding light in the filter component's spectral region by a quarter wavelength, the quarter wave retarder 96 converts right circularly polarized light in the spectral region to a first orientation of linearly polarized light, and left circularly polarized light to a second orientation. The linear polarizer 98 (which may be a dyed, stretched plastic linear polarizer) is oriented accordingly to block linearly polarized light of the second orientation. Consequently, any left circularly polarized green light not reflected by the exit circular polarizer is converted by the quarter wave retarder to a linear polarization orientation that will be blocked by the linear polarizer 98. Green light that is right circularly polarized by the entrance polarizer 92 and retarder 94 so as to be transmitted by the exit polarizer 93 will also be substantially completely transmitted by the linear polarizer 98.

Figure 8:
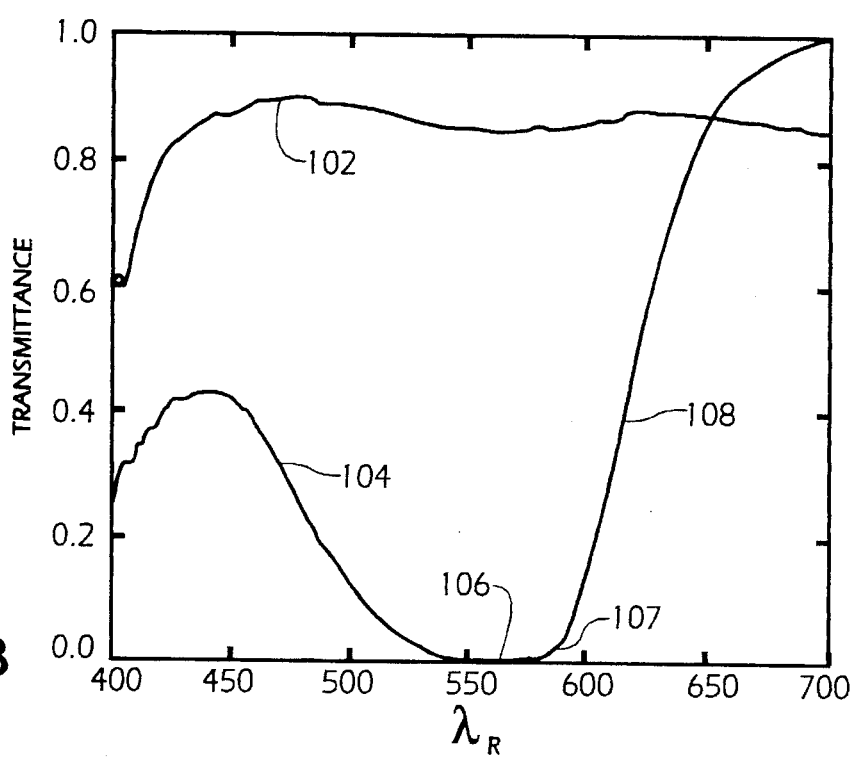
FIG. 8 is a normalized spectrophotometer plot of a magenta CLC polarizer, quarter wave retarder, and linear polarizer useable in a filter component of the type shown in FIG. 10.

Referring to FIG. 8, spectrophotometer plots 102, 104 demonstrate the improvement in performance that can be made with the inclusion of the linear polarizer 98 and retarder 96 in the filter component 90 (FIG. 10). The plots 102, 104 show the transmittance of the two circular polarizations of light for an exemplary magenta CLC polarizer 93, quarter wave retarder 96, and dyed, stretched plastic linear polarizer 98 in combination. As described above and shown in FIG. 6, the spectral plot 47 of the magenta CLC polarizer 93 has a sharp toe 50 and steep skirt 52. However, the depth of the reflection band may not be adequate. In its reflection band, the CLC polarizer is not completely attenuating. It still transmits a few percent of the incident polarized light.

The spectral response can be made more attenuating when the CLC polarizer 93 is used in combination with the linear polarizer 98. In comparison with the CLC polarizer 93, the spectral response (not shown) of the magenta linear polarizer 98 has a weak toe and gradually sloping skirt, but is more attenuating in the green band. Preferably, the linear polarizer 98 is lightly dyed to increase its transmission in the red and blue bands. When placed in combination, the CLC polarizer 93 and linear polarizer 98 produce a spectral response 104 which is more completely attenuating in the green band 106 and still provides a relatively sharp toe 107 and steep skirt 108. Accordingly, in a display subassembly employing filter components of the configuration shown in FIG. 10, this spectral response shape of the CLC and dichroic polarizer combination provides a darker black and increased contrast.

From the foregoing discussion, it will be recognized that the entrance circular polarizer 40 and variable retarder 35 of the magenta/white filter component 23 illustrated in FIG. 5 cooperate to selectively polarize green light to right or left handed circular polarizations so that the green light is either attenuated or transmitted, respectively, by the exit analyzer 41. A similar result to that of the entrance circular polarizer 40 and variable retarder 35 can be obtained with a linear polarizer and STN-LCD panel configured according to a third embodiment of the invention.

Figure 11:
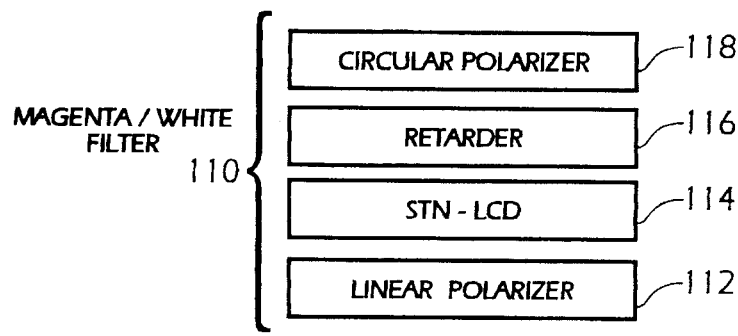
FIG. 11 is a schematic diagram of a magenta/white optical notch filter component according to a third embodiment of the invention.

Turning now to FIG. 11, in a magenta/white optical notch filter component 110 according to a third embodiment of the invention, green light is selectively and controllably polarized to right or left handed circular polarizations by a linear polarizer 112, STN-LCD panel 114, and a retarder 116 so as to be either transmitted or attenuated by an exit circular polarizer (analyzer) 118. Light entering the filter component 110 is linearly polarized to a particular orientation with the linear polarizer 112, which may be a dichroic dyed, stretched plastic linear polarizer. Preferably, the linear polarizer 112 is dyed so that light outside the green spectral region (i.e. red and blue light) is substantially completely transmitted, unpolarized.

The linearly polarized light is then passed through the STN-LCD panel 114 and retarder 116 to controllably form right and left handed circularly polarized green light. Retardation is accomplished by suitably selecting the characteristics of the STN-LCD panel and retarder 116. For example, the retarder 116 can be suitably realized with a retardation film that produces a quarter wavelength retardation of the linear components when its optic axis is aligned with that of the STN-LCD panel. The thickness of the STN-LCD panel can be chosen-accordingly as described above to produce zero wavelength retardation of green light when in its nonselected state and a half wavelength retardation when in its selected state. The combination of such a retarder and STN-LCD panel would provide the desired quarter and three quarters wavelengths retardation of the orthogonal linear components. Optic notch filter components can be similarly formed to selectively attenuate light in other spectral regions.

Figure 12:
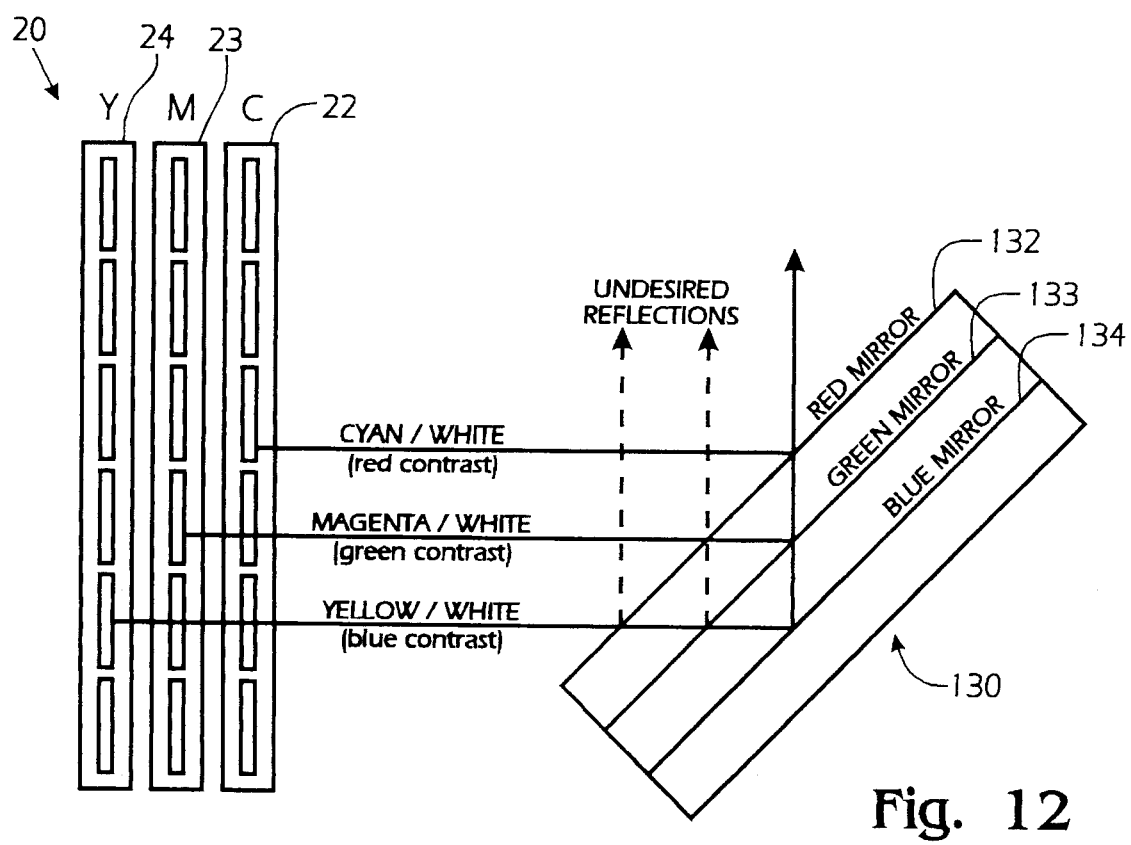
FIG. 12 is a schematic diagram of the color LCD display subassembly of FIG. 1 and a stacked assembly of dichroic mirrors used to correct depth of focus.

Referring now to FIG. 12, the particularly selective color response of the filter components 22–24 in the display subassembly 20 corrects the problem of in the display subassembly 20 corrects the problem of ghosting when the display subassembly's depth of focus is compensated by a stacked dichroic mirror assembly 130 as shown. The mirror assembly 130 comprises blue, green and red dichroic mirrors 132–134 in a layered configuration. When the display subassembly 20 projects a color image on a viewing screen, the physical offset of the filter components causes different colors of light in the image to have slightly different focal depths. The stacked dichroic mirror assembly 130 corrects the depth of focus problem as described by Mathewson in U.S. Pat. No. 5,184,234, the disclosure of which is incorporated herein by reference.

A ghosting effect, however, can result if the filter components 22–24 affect the transmission of light outside their controlled spectral region. For example, red light is attenuated by the pixel 135 in the cyan/white filter component 22 when nonselected. (In this example, light is projected through the subassembly in the opposite direction as that shown in FIG. 1.) If the pixel 135 also partially attenuates blue and green light (which are outside its stop band), there is an apparent change in the reflections of these colors from the blue and green mirrors 132, 133. These undesired reflections will be perceived as a ghost or displaced shadow of an object in the projected image. As compared to prior stacked LCD displays, the filter components 22–24 have much improved transmission of light outside their stop bands. Since the filter in their passbands, the display subassembly 20 produces little or no perceivable ghosting when its depth of focus is compensated by the mirror assembly 130.

As described above with reference to the notch filter component 90 (FIG. 10), better attenuation of light in the filter component's stopband can be achieved when the light is analyzed twice (e.g. once by the circular polarizer 93 and once by the linear polarizer 98). The increased attenuation provided by doubly analyzing light in each color band (e.g. red, green, and blue) of a display system can be applied to improve its contrast.

Figure 13:
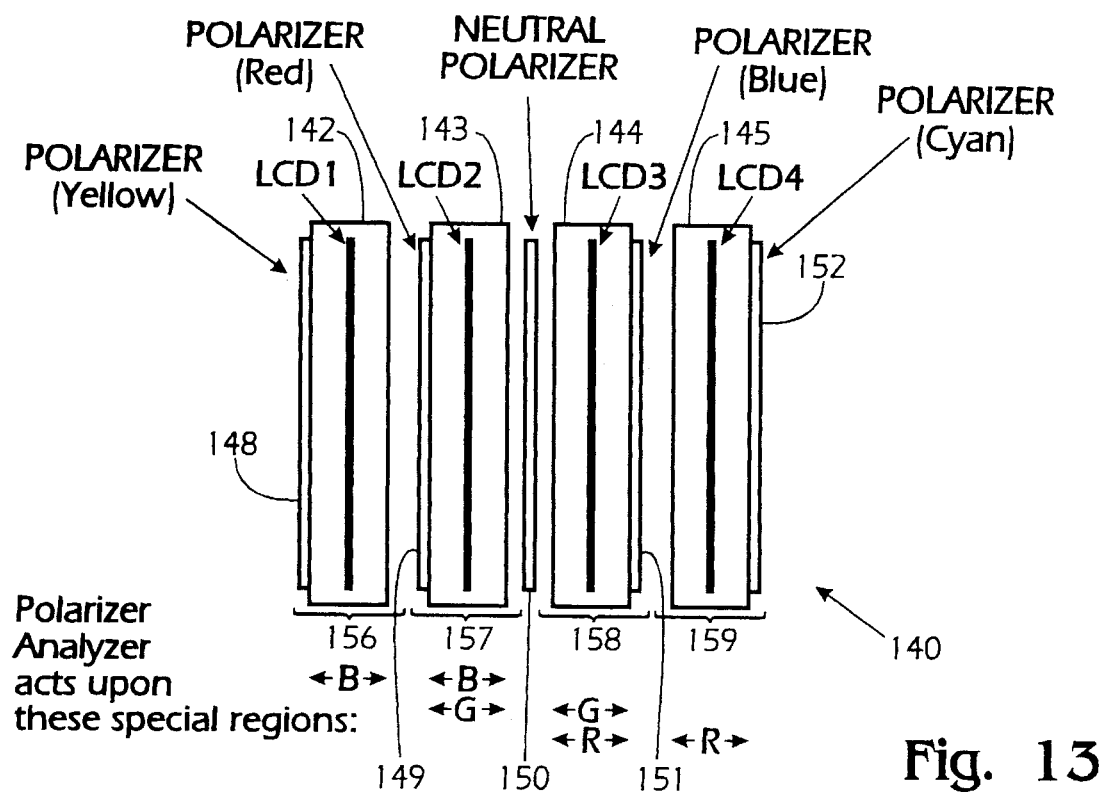
FIG. 13 is a schematic diagram of a display subassembly according to a fourth embodiment of the invention which provides double analysis of light in each color band for improved contrast.

With reference to FIG. 13, a display subassembly 140 is configured according to a fourth embodiment of the invention to provide controllable double analysis of each color band. The display subassembly comprises four variable retarders 142–145 and five polarizers 148–152, with the variable retarders interposed between adjacent polarizers. Each of the variable retarders 142–145, together with its adjacent polarizers, forms filter components 156–159 of the display subassembly. As with the variable retarder 35 (FIG. 5) described above, the variable retarders 142–145 each may comprise an active LCD layer which is appropriately tuned and compensated to operate in conjunction with its adjacent polarizers. The polarizers 148–152 include a neutral polarizer 150 in the center of the display subassembly and colored polarizers 148, 149, 151, 152. The colored polarizers are chosen such that each of the color bands, red, green, and blue, is analyzed twice. Preferably, the polarizers 148–152 are CLC polarizers which provide high transmission and steep stopband skirts. However, some or all of the polarizers 148–152 can be implemented with linear polarizers. Each of the polarizers may comprise one or more polarizing layers to provide polarization of light across the desired color band or color bands.

One possible configuration of polarizers in the display subassembly 140 is illustrated in FIG. 13 where the polarizers 148–152 include, in order, yellow, red, neutral, blue, and cyan polarizers. In this display subassembly 140, blue light is analyzed in the first and second filter components 156, 157. If light enters the display subassembly 140 from the left in FIG. 13, the blue light is polarized by the yellow polarizer 148 (the color designation of the polarizer denotes the color which is transmitted unpolarized), then analyzed by the red and neutral polarizers 149, 150. The variable retarders 142–143 control the polarization of the blue light and, consequently, determine whether blue is attenuated or transmitted when analyzed. Thus, blue light can be selectively attenuated twice. Similarly, green light is analyzed in both the second and third filter components 157, 158. The red polarizer 149 polarizes the green light, then each of the neutral and blue polarizers 150, 151 analyze it. In the third and fourth filter components 158, 159, red light is polarized by the neutral polarizer 150 and analyzed by the blue and cyan polarizers 151, 152.

Other configurations of the display subassembly 140 which consist of alternative orderings and selections of the colored polarizers 148, 149, 151, 152 also can be made. Preferably, but not necessarily, the polarizers 148–152 in the display subassembly 140 are chosen such that the outer-most filter components 156, 159 each control one color band which is also controlled by one of the center-most filter components 157, 158. For example, in the illustrated configuration, the outer-most filter components 156, 159 control blue and red color bands, respectively, which also are controlled by the center-most filter components 157, 158, respectively. This prevents or reduces interaction by the center-most filter components 157, 158 with the operation of the outer-most filter components 156, 159.

The display subassembly 140 with four filter components can be formed from a three component subassembly, such as the display subassembly 20 in FIG. 1, by simply replacing the center variable retarder 35 with a series stacked variable retarder, neutral polarizer, and variable retarder. Because of the double analysis of each color band provided by the four component subassembly 140, a much improved contrast ratio can be achieved in comparison with like three filter component display subassemblies. For example, with a three component subassembly 20 (FIG. 1) according to the invention, a contrast ratio of approximately 50:1 can be achieved. By reconfiguring the subassembly with an added neutral polarizer and fourth variable retarder, a contrast ratio of approximately 5000:1 can be obtained. A computer simulation of an exemplary four filter component display subassembly 140 produces a contrast ratio of over 5000:1. In practice, the transmission of the subassembly also decreases, but only by about 10%. However, the penalty in subassembly transmission is much less for analyzing each color band the second time since each color band is already polarized for the first time it is analyzed. (The initial polarization of light in each color band causes the greatest loss in transmission for the subassembly of approximately 50% as previously noted.)

A further advantage of the four filter component display subassembly 140 is that each side of each of the primary color bands (4 sides total) are independently determined by a separate one of the colored polarizers 48, 149, 151, 152. For example, the shape of the right edge of the blue color band (when red and green are attenuated) is determined by the spectral response of the blue polarizer. Likewise, the shape of the left edge of the red color band is determined by the spectral response of the red polarizer (which attenuates blue and green). The shapes of the left and right edges of the green color band are determined by the yellow and cyan polarizers, respectively. This independent color determination provides greater design freedom in adjusting the colors produced by the subassembly.

One drawback to this configuration, however, is that only a very dark magenta can be produced. To form magenta, both blue and red light must be transmitted while green is attenuated. In the subassembly 140, however, green is attenuated by controlling the center variable retarders 143, 144 to pass light cross polarized to their exit analyzers. In the red filter component 157, this attenuates both green and blue. In the blue filter component 158, this attenuates both green and red. Consequently, when both filter components 157, 158 are operated to attenuate green, only a small amount of red and blue light remain, forming a dark magenta.

This problem can be partially corrected so that the subassembly produces a brighter magenta by designing or operating the red filter component 157 to leak some blue light and the blue filter component 158 to leak some red light. The filter components 157, 158 can be made to leak blue and red, respectively, by operating the variable retarders 143, 144 at some intermediate state at which light is not completely cross polarized with respect to the filter components exit analyzers. This still results in a magenta which is, at best, about half the brightness of red.

A better solution is to design the subassembly so that the red and blue filter components 157, 158 leak blue and red light, respectively, in their green attenuating states. For example, the variable retarder 143 of the red filter component 157 can be tuned so that when green light is cross polarized with respect to the exit analyzer, blue light is not completely cross polarized. The variable retarder 144 can be similarly tuned to produce substantially cross polarized green light and red light that is not completely cross polarized in one state. The leaked red and blue light increase the subassembly's magenta brightness. The leaked blue and red light can be attenuated by the yellow and cyan filter components 156, 159, respectively, when it is desired to make red or blue light.

Figure 14:
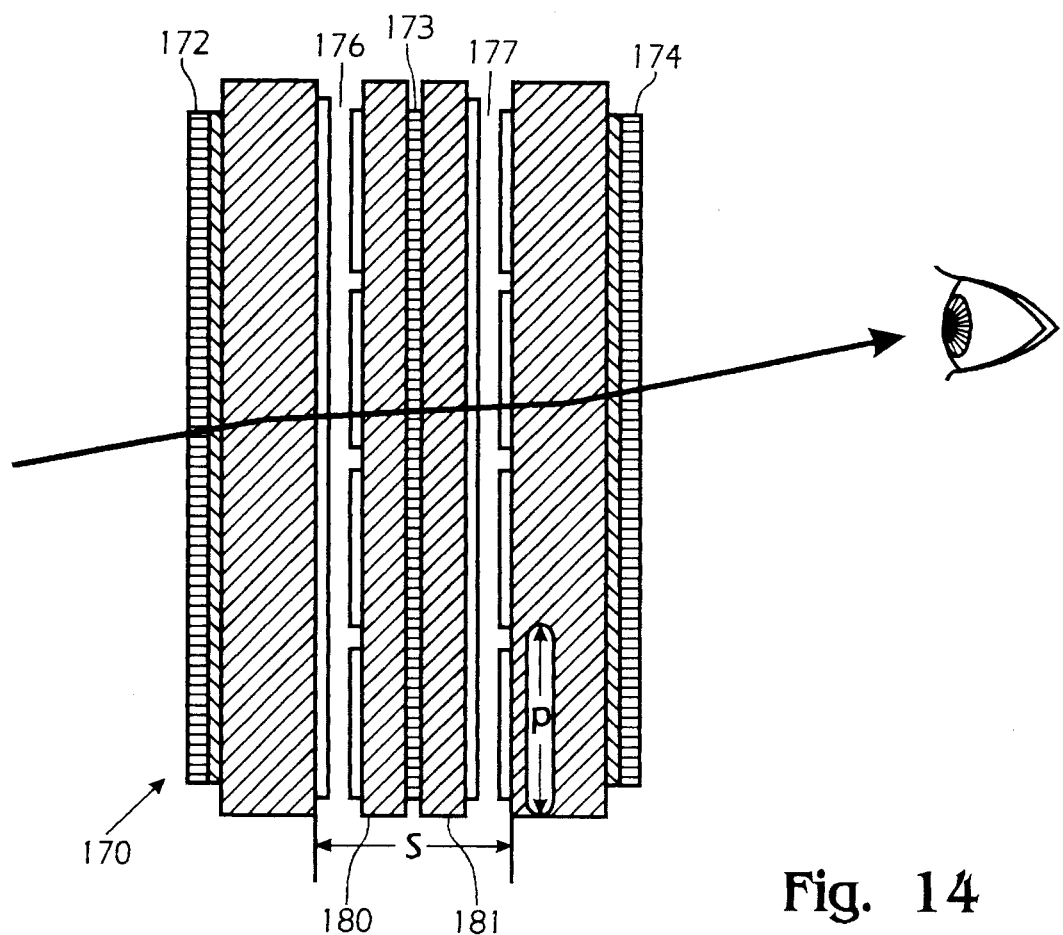
FIG. 14 is a schematic diagram of a directly viewable, doubly analyzing display subassembly employing two guest-host type LCD layers according to a fifth embodiment of the invention.

Referring to FIG. 14, in a further alternative embodiment of a doubly analyzing display subassembly 170, guest-host type LCD layers are employed to reduce the number of LCD layers required. As in dyed, stretched plastic linear polarizers, guest-host type LCD layers contain a dye material that absorbs a particular color of light. The guest dye molecules are oriented with those of the host LCD material so that only a particular polarization of the light is absorbed.

In the display subassembly 170, guest-host type LCD layers 176, 177 are placed between a center neutral polarizer 173, and two colored polarizers 172, 174. Generally, the dye in a guest-host type LCD layer has only one absorption color. So, to doubly analyze each primary color, the colored polarizers are chosen to each polarize in two color bands. In the illustrated embodiment, the subassembly comprises red and blue polarizers 172, 174, and yellow and cyan dyed guest-host LCD layers 176, 177. Accordingly, green is analyzed by each of the red and blue polarizers 172, 174. Red is analyzed by the blue polarizer 174 and the cyan dye in the guest-host LCD layer 177. Blue is analyzed by the red polarizer 172 and yellow dyed guest-host LCD layer 76.

This two layer, doubly analyzing subassembly 170 is particularly advantageous for use in a directly viewable subtractive color display system which must be thin to avoid the parallax problem. With only two LCD layers, the subassembly can be made quite thin. The effective thickness of the subassembly can be further reduced by utilizing thin plastic or glass microsheet substrates 180, 181 on one or both sides of the center neutral polarizer 173. With such construction, the effective thickness (approximately s/1.5) of the subassembly can be made less than the pixel pitch (p) so that the pixels of the LCD layers 176, 177 appear to be aligned even when viewed from an angle 45° to the subassembly.

Double analysis of a color band can also be obtained in a three LCD layer, four polarizer subassembly (not shown) through use of guest-host type LCD layers.

The foregoing disclosure has introduced many filter components and subassemblies that are widely applicable throughout the field of display technology. The applications particularly illustrated are only a small sampling. Examples of other display techniques and applications that each benefits by substitution of the present technology are disclosed in U.S. Pat. No. 5,050,965 to Conner, et al., which is incorporated by reference above; in U.S. patent application Ser. No. 08/046,219 to Biles et al., which is hereby incorporated by reference as if fully set forth herein; in A. R. Conner et al., "Pulse-Height Modulation (PHM) Gray Shading Methods for Passive Matrix LCDs" and B. Clifton et al., "Optimum Row Functions and Algorithms for Active Addressing", which are incorporated herein by reference.

Having described and illustrated the principles of our invention with reference to a preferred embodiment and several variations thereof, it will be recognized that the invention can be modified in arrangement and detail without departing from such principles. For example, retro-reflective sheet polarizers operate as linear polarizers and can be substituted for dyed, stretched plastic polarizers in the above described embodiments of the invention. In view of the many possible embodiments to which the principles of our invention can be put, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. An optical notch filter having on and off states comprising:

a first cholesteric layer;

a liquid crystal layer operable in first and second states of birefringence;

a second cholesteric layer; and at least one passive retardation layer stacked with the liquid crystal layer between the first and second cholesteric layers and operative to compensate the birefringence of the liquid crystal layer in the first state to effect zero retardation of light between the cholesteric layers.

2. The optical notch filter of claim 1 wherein the first and second cholesteric layers reflect opposite handed circularly polarized light in a predetermined spectral region whereby light in the predetermined spectral region is more uniformly attenuated in the first state.

3. The optical notch filter of claim 2 wherein the liquid crystal layer in the second state effects half-wave retardation of light in the predetermined spectral region.

4. The optical notch filter of claim 1 wherein the first and second cholesteric layers reflect same handed circularly polarized light in a predetermined spectral region whereby light in the predetermined spectral region is more uniformly transmitted in the first state.

5. The optical notch filter of claim 4 wherein the liquid crystal in the second state effects half-wave retardation of light in the predetermined spectral region.

6. An optical notch filter having on and off states comprising:

a first cholesteric layer;

a liquid crystal layer operable in first and second states of birefringence;

a second cholesteric layer; and at least one passive retardation layer stacked adjacent one of the first and second cholesteric layers and operative to compensate the birefringence of the liquid crystal layer in the first state to effect zero retardation of light between the cholesteric layers.

7. The optical notch filter of claim 6 further comprising a linear polarizer used in conjunction with at least one of the first and second cholesteric layers to enhance the optical attenuation when said liquid crystal layer is in one of the first and second states.

\* \* \* \* \*